(12) United States Patent
Lin et al.

(10) Patent No.: US 8,326,832 B2
(45) Date of Patent: Dec. 4, 2012

(54) ON-DEMAND DATA MANAGEMENT SYSTEM AND METHOD

(75) Inventors: Jacky Lin, Hsinchu (TW); Hsien-Ying Tseng, Pusin Township, Changhua County (TW); Ging-Fang Yen, Beidou Township, Changhua County (TW); Shiun-Huan Lai, Jhonghe (TW); Chii-ming M. Wu, Hsinchu (TW); Jiing-Shin Shyu, Hsinchu (TW); Jhon-Jhy Liaw, Sanchong (TW); Wesley Lin, Chubei (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 472 days.

(21) Appl. No.: 11/113,578

(22) Filed: Apr. 25, 2005

(65) Prior Publication Data

US 2006/0242168 A1    Oct. 26, 2006

(51) Int. Cl.
*G06F 7/00*    (2006.01)
*G06F 17/30*    (2006.01)

(52) U.S. Cl. ............................................. 707/736

(58) Field of Classification Search .................. 707/736, 707/999.2
See application file for complete search history.

(56) References Cited

U.S. PATENT DOCUMENTS

| 6,105,042 | A | 8/2000 | Aganovic et al. ............. 707/500 |
| 6,950,987 | B1 * | 9/2005 | Hargraves et al. ............ 715/207 |
| 2003/0004947 | A1 * | 1/2003 | Coverston .......................... 707/9 |
| 2004/0199566 | A1 * | 10/2004 | Carlson et al. ................ 709/201 |
| 2004/0209176 | A1 * | 10/2004 | Pierrat ............................. 430/5 |

OTHER PUBLICATIONS

Rubin, "Computer Aids for VLSI Design," Jan. 1, 1997, Second Edition, 8-13.*
IEEE, "The Authoritative Dictionary of IEEE Standards Terms," 01/01/200, IEEE Press, Seventh Edition, 432.*

* cited by examiner

*Primary Examiner* — Aleksandr Kerzhner
(74) *Attorney, Agent, or Firm* — McClure, Qualey & Rodack, LLP

(57) ABSTRACT

An on-demand data management system. The system comprises a file management module and a demand analysis module. The file management module receives files. Each file has attributes. The file management module segments the files according the attributes. The demand analysis module receives a data demand and selects data from the segmented files according to the data demand.

21 Claims, 3 Drawing Sheets

ON-DEMAND DATA MANAGEMENT SYSTEM AND METHOD

BACKGROUND

The present invention relates to a data management technology and in particular to on-demand systems and methods for data management.

In present data management systems, data is typically stored on a database server and managed by data owners. Readers can demand data via a network connected to the database server. Readers download desired data from the database server via the network. For example, a data owner uploads a 1 GB (Gigabyte) file to a database. A reader browsing the file determines it contains desired data. If the desired data is in the file, conventionally, the entire 1 GB file will be sent to the reader, even though only a portion of the data is needed, such as 2 MB (Megabyte), requiring excessive network bandwidth.

Additionally, researchers and developers typically cooperate during research. Each researcher in a research group may only need a portion of a large file. If each researcher downloads the entire file, excessive network bandwidth use may cause serious overload issues and potential security leaks may occur. For example, IC (integrated circuit) layout research is typically carried out operated in cooperation mode. IC layout related files are usually large but each researcher generally requires only a portion of the data therein.

Thus, it is impractical to send every researcher the entire file. In addition, the IC layout file should be viewed and modified according to the different security rank and field of the researchers. A better data management solution is to send only the portions of a file desired by the readers.

U.S. Pat. No. 6,105,042 discloses a multi-user information management system adopted for efficient, remote, on-demand document management, storage and retrieval. The above US patent provides a system which dynamically transfers stored documents to match the characteristics of a user terminal and viewing options to avoid the transfer of a higher resolution document to lower resolution terminals. Therefore, U.S. Pat. No. 6,105,042 focuses on the transfer of different document formats and conditions, not suitable for resolving the mentioned data management problems.

Other on-demand data management systems focus mainly on multimedia data processing, such as on-demand video systems. Thus, the conventional and present data management method and system cannot resolve the mentioned problems.

SUMMARY

Accordingly, an object of the invention is to provide a on-demand data mechanism for data management. The inventive method and system enables access to desired data only according to specific requests for reducing excessive network bandwidth consumption. Additionally, the disclosed method and system also can be applied to security management.

To achieve the foregoing and other objects, the invention discloses an on-demand data management system. The system comprises a file management module and a demand analysis module. The file management module receives files with attributes and segments the file according to the attributes. The segmented files and the attributes thereof are collected as mapping information by the file management module. The demand analysis module receives a data demand and selects data from the segmented file according to the data demand by referring to the mapping information.

BRIEF DESCRIPTION OF THE DRAWINGS

The present invention can be more fully understood by reading the following detailed description and examples with references made to the accompanying drawings, wherein.

DETAILED DESCRIPTION OF THE INVENTION

Figure 1:
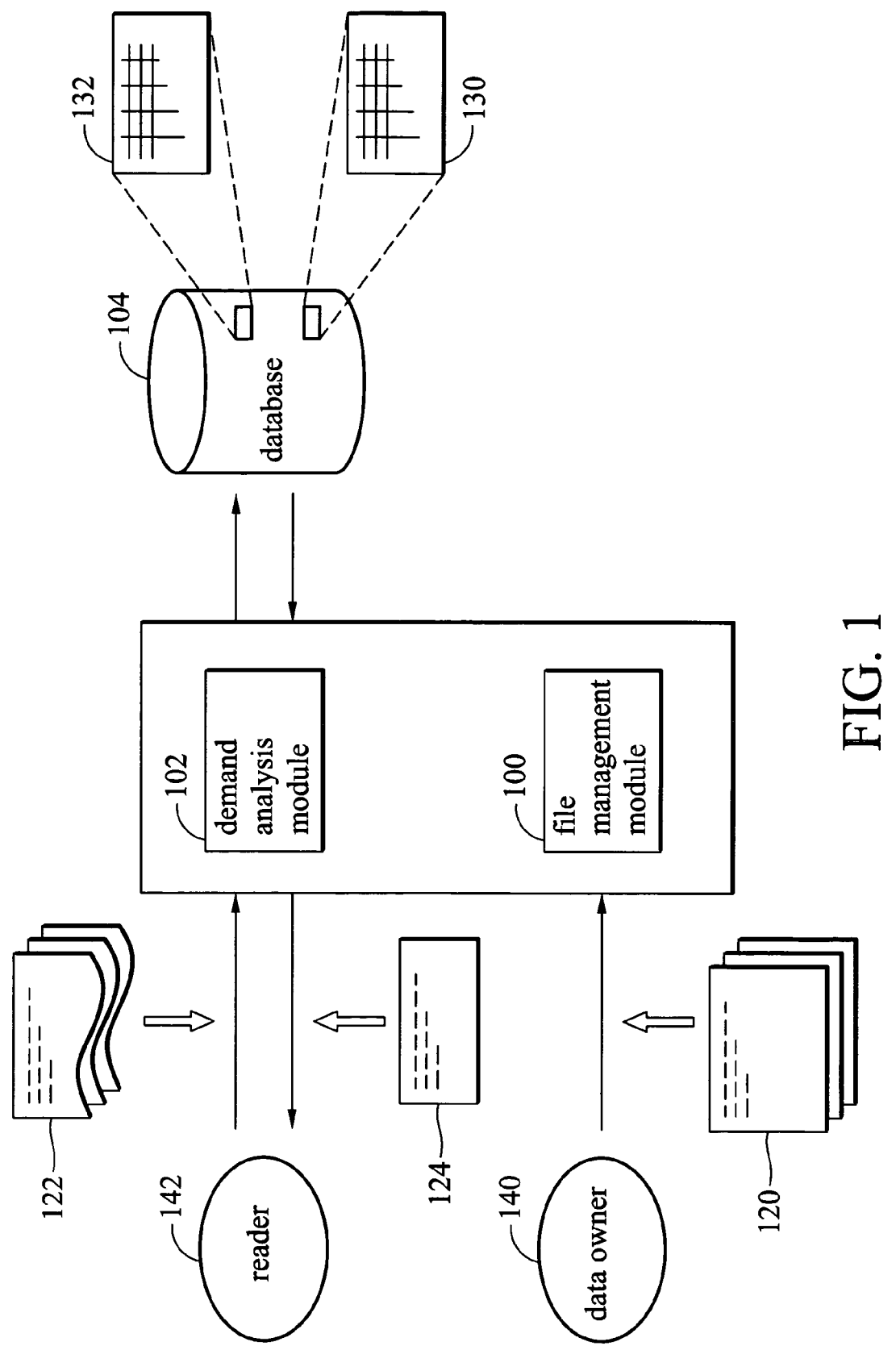
FIG. 1 is a diagram of the on-demand data management system according to one embodiment of the present invention.

As summarized above, the present invention discloses on-demand data management systems comprising a file management module and a demand analysis module.

The file management module receives files, wherein each of the files has attributes. The attributes can be subfilenames of the files. If the file is a GDS file, the attributes also can be file hierarchy of the file. The smallest level of the file hierarchy is test line, utilized in mask or circuit related files.

The file management module segments the files according to the attributes. The file management module further collects the relationship of the attributes and the segmented files as mapping information. Here, if the file is a GDS file, the mapping information comprises documents and images. The segmented files and the mapping information are stored in a database by the file management module.

The demand analysis module displays the mapping information including documents and images. A data demand is received and analyzed according to the mapping information by the demand analysis module. For example, the data demand may comprise some key words. The demand analysis module selects data from the segmented files according to the data demand by referring to the mapping information.

Thus, an on-demand data management system is provided. In the provided on-demand data management system, data owners can upload files to a database via a network. The inventive system segments the uploaded files according to the file attributes, such as subfilenames or file hierarchy. The relationship between the segmented files and the file attributes is collected as mapping information. The segmented files and the mapping information are stored in a database. The mapping information may be displayed via the network for readers entering data demands through user interface. The readers enter data demands according to the mapping information. The entered data demands are then analyzed according to the mapping information. The demanded data is then selected from the segmented files according to readers data demands.

One important application of the present invention is security management. For example, if a research group is composed of engineers, supervisors, and secretaries and an IC layout file is shared by the research group, the supervisors have the highest security rank and can view the entire file. Each engineer has a security rank and can view part of the file related to his job. The secretaries cannot view the file. The security management of the shared file can be accomplished by the segment characteristic of the present invention. Because data files are segmented, different segments can be designated as viewable by different security ranks. Thus, the segmented files can be delivered and displayed to readers according to their security rank.

Moreover, an on-demand data management system is disclosed for a data owner side. The disclosed system receives files, wherein each file has attributes, and the files are segmented according to the attributes. Here, again, the disclosed system further collects the relationship between the segmented files and the file attributes as mapping information. The segmented files and the mapping information are stored in a database.

Furthermore, an on-demand data management system is disclosed for a reader side. The disclosed system receives and analyzes a data demand according to mapping information. The mapping information may be displayed to readers by the system. The system selects data from segmented files according to data demands and by referring to the mapping information. Here, each of the segmented files has attributes and the mapping information is the relationship of the file attributes and the segmented files. If the file is a GDS file, the mapping information may include documents and images.

In addition, the invention provides a computer implemented on-demand data management method. The method first receives files, wherein each of the files has attributes, such as subfilename or file hierarchy. The method then segments the files according the attributes. Next, the relationship between the segmented files and the file attributes is collected as mapping information. The mapping information may be stored in a database and displayed. A data demand is then received. The data demand is then analyzed according to the mapping information. Finally, the method selects data from the segmented files according to the data demand by referring to the mapping information.

The inventive method can be implemented as an integrated solution or performed separately on reader and data owner sides respectively. That is, the data processing steps of the present invention can be separated into two or more parts for actual implementation. Each part executes certain steps of the present invention.

For example, the data owner side may execute the steps of receiving files and segmenting the files according the attributes. The data owner side may also collect the relationships between the segmented files and the file attributes as mapping information and stores the relationships in a database. The reader side may execute the steps of receiving and analyzing a data demand according to the mapping information stored on the data owner side, and select data from the segmented files according to the data demand by referring to the mapping information.

Moreover, the invention discloses a machine-readable storage medium for storing a computer program providing an on-demand data management method. The method comprises the above mentioned steps.

FIG. 1 is a diagram of the on-demand data management system according to one embodiment of the present invention. In this embodiment, the system comprises a file management module 100 and a demand analysis module 102.

The file management module 100 receives files 120 wherein each file has an attribute, such as subfilenames. More concretely, document files, image files, audio files, and graph files generally have different subfilenames, representing an attribute of a file.

The file management module 100 segments the files 120 according to attributes. For example, document files, image files, audio files, and graph files are segmented by different methods. The document files are segmented by text sections while the image files are segmented by images. The file management module 100 further collects the relationship of the attributes and the segmented files as mapping information 130. The segmented files 132 and the mapping information 130 are stored in a database 104 by the file management module 100.

The demand analysis module 102 displays the mapping information 130. A data demand 122 is received and analyzed according to the mapping information 130 by the demand analysis module 102. The demand analysis module 102 selects data 124 from the segmented files 132 according to the data demand 122 by referring to the mapping information 130.

The invention can be implemented on a data owner side 140, as shown in FIG. 1. The disclosed system receives files 120, wherein each file has an attribute, and segments the files 120 according the attributes. The system further collects the relationship between the segmented files and the file attributes as mapping information 130. The segmented files 132 and the mapping information 130 are stored to a database 104.

The invention can be also implemented on a reader side 142. The disclosed system receives and analyzes a data demand 122 according to mapping information 130. The mapping information 130 may be displayed to readers 142 by the disclosed system. The disclosed system selects data 124 from segmented files 132 according to the data demand 122 by referring to the mapping information 130. Here, each segmented file has an attribute and the mapping information 130 is the relationship of file attributes and the segmented files 132.

In the mentioned system, the database storing the segmented files and the mapping information may be designed according to various architectures. For example, the segmented files and the mapping information can be stored in different databases. Alternatively, the segmented files and the mapping information may be stored in an integrated database. Moreover, the file management module and the demand analysis module can be established as integrated or separate depending on the actual implementation requirements.

Figure 2:
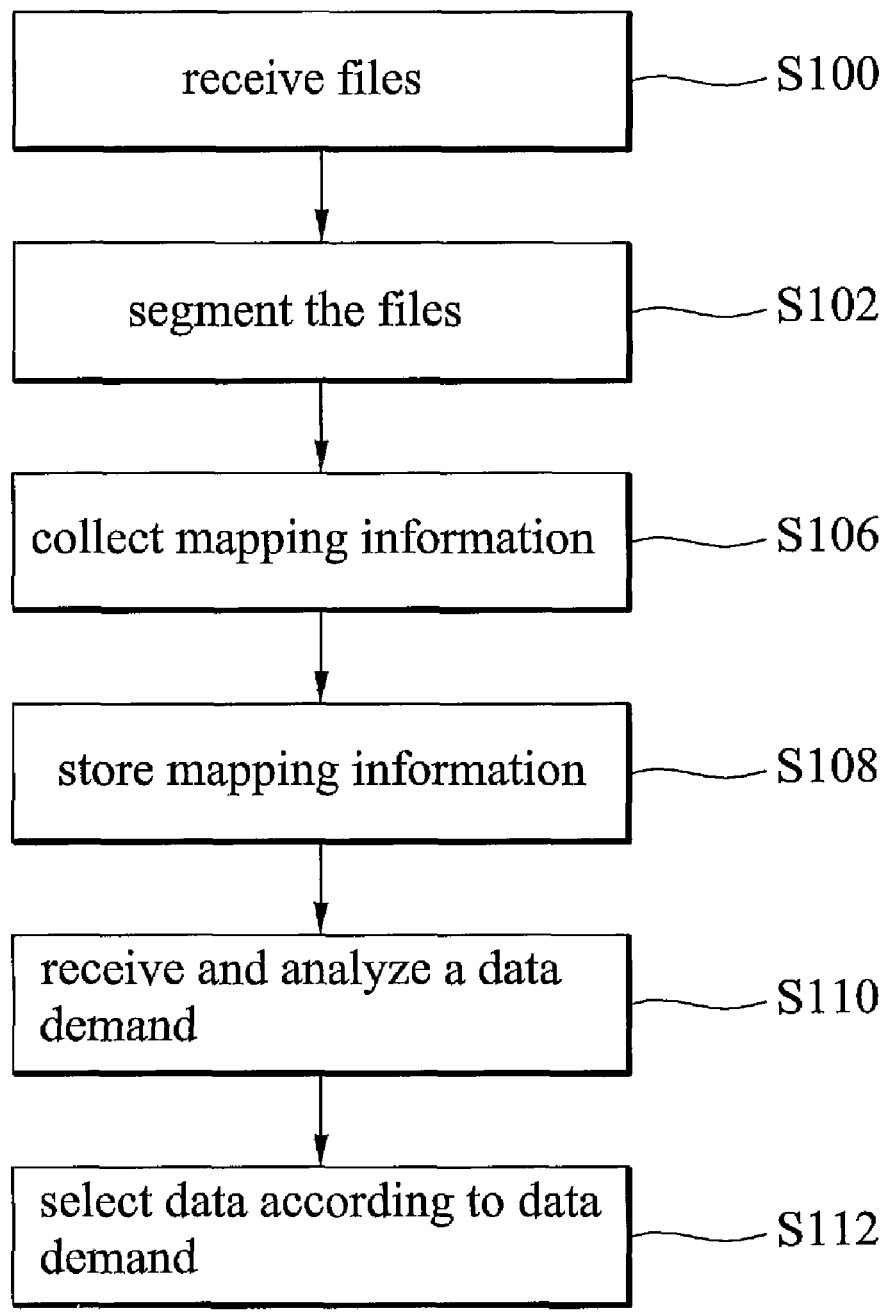
FIG. 2 is a flowchart of the on-demand data management method according to one embodiment of the present invention.

FIG. 2 is a flowchart of the on-demand data management method according to one embodiment of the present invention. The invention provides a computer implemented on-demand data management method. The method first receives files (step S100), wherein each file has an attribute. The method then segments the files according the attributes (step S102). Next, the relationship between the segmented files and the file attributes is collected as mapping information (step S106). The mapping information may be stored in a database (step S108). A data demand is then received (step S110). The data demand is then analyzed according to the mapping information (step S110). Finally, the method selects data from the segmented files according to the data demand by referring to the mapping information (step S112).

Figure 3:
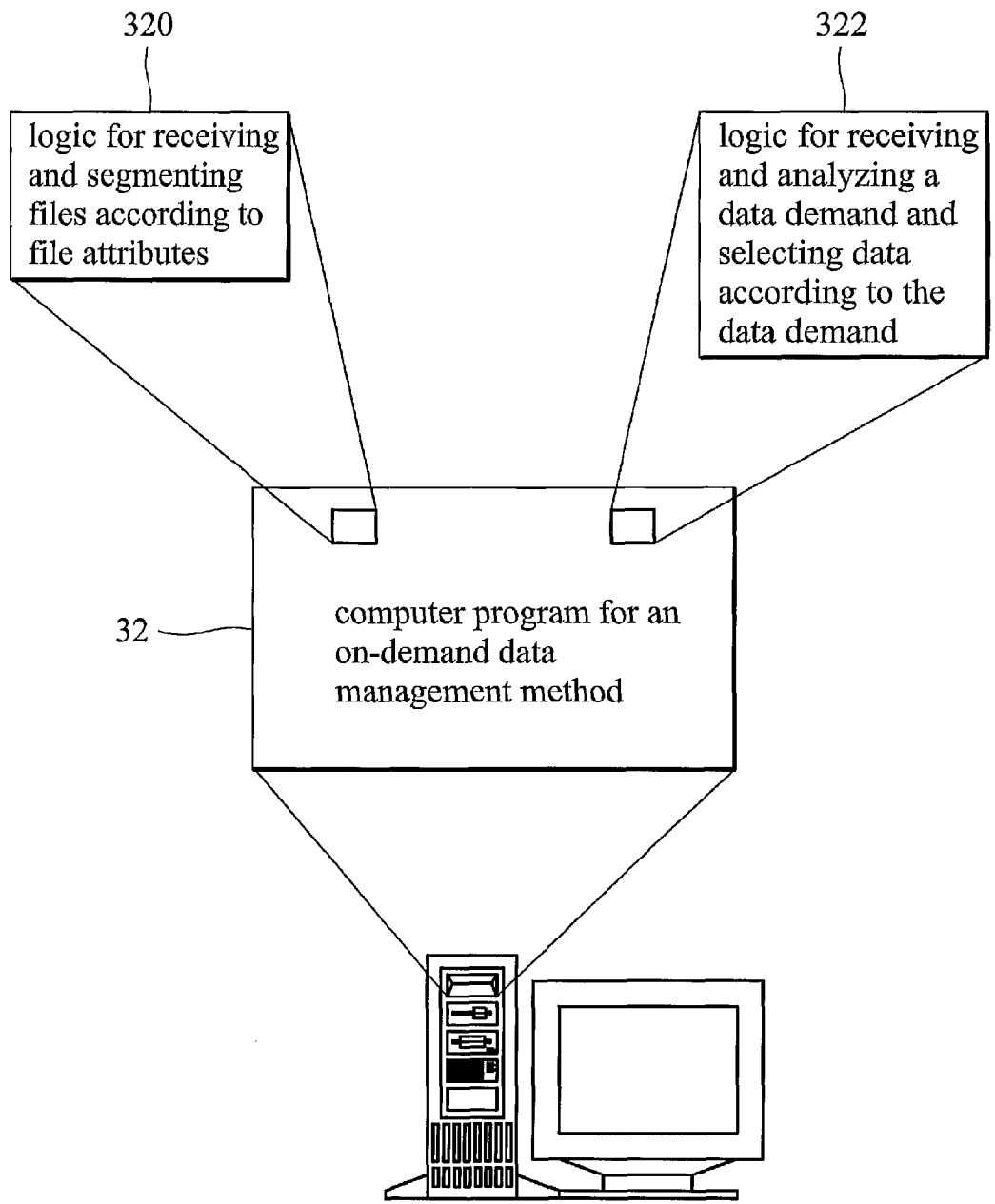
FIG. 3 is a diagram of the machine-readable storage medium for storing a computer program providing an on-demand data management method.

FIG. 3 is a diagram of the machine-readable storage medium for storing a computer program providing an on-demand data management method. The computer program 32 mainly includes logic for receiving and segmenting files according to file attributes 320 and logic for receiving and analyzing a data demand and selecting data according to the data demand 322.

Thus, an on-demand data management system is provided by embodiments of the invention. The disclosed system allows readers to enter data demands and responds with the corresponding data, resolving the data management problems presented by a network. The present invention offers significant improvements if the data files transferred in the network are very large.

It will be appreciated from the foregoing description that the system and method described herein provide a dynamic and robust solution to the data management problem. If, for example, the architecture of databases or readers and data owners is altered, the system and method of the present invention can be adjusted accordingly.

The methods and system of the present invention, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code transmitted over a transmission medium, such as electrical wire, cable, fiberoptics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An on-demand data management system having a computer, the management system comprising:
    a file management module for receiving at least one file, wherein each file has attributes, the at least one file being segmented according to the attributes to generate a plurality of segmented files, the plurality of segmented files are designated as viewable by a plurality of security ranks, wherein the attributes comprise a file extension of the corresponding file, the file being a GDS (Graphics Data System) file, and the GDS file is segmented according to a plurality of GDS levels included in an intrinsic file hierarchy in the GDS file of the attributes; and
    a demand analysis module, coupled to the file management module, for receiving and analyzing a data demand comprising one of the plurality of security ranks, and selecting data from the plurality of segmented files according to the data demand.

2. The on-demand data management system of claim 1, wherein the file management module further stores the plurality of segmented files in a database.

3. The on-demand data management system of claim 1, wherein the file management module further collects the relationship of the attributes and the plurality of segmented files as mapping information, and if the file is a GDS file, the mapping information comprises documents and images.

4. The on-demand data management system of claim 3, wherein the file management module further stores the mapping information in a database.

5. The on-demand data management system of claim 3, wherein the demand analysis module analyses the data demand according to the mapping information.

6. The on-demand data management system of claim 3, wherein the demand analysis module selecting the data further refers to the mapping information.

7. The on-demand data management system of claim 3, wherein the demand analysis module further displays the mapping information.

8. An on-demand data management system, the system having a computer receiving at least one file, wherein each file has attributes, the at least one file being segmented according to the attributes to generate a plurality of segmented files, the plurality of segmented files are designated as viewable by a plurality of security ranks, wherein the attributes comprise a file extension of the file, the at least one file is a GDS (Graphics Data System) file, and the at least one GDS file is segmented according to a plurality of GDS levels included in an intrinsic file hierarchy in the GDS file of the attributes.

9. The on-demand data management system of claim 8, wherein the system further stores the plurality of segmented files in a database.

10. The on-demand data management system of claim 8, wherein the system further collects the relationship of the attribute and the plurality of segmented files as mapping information, and if the file is a GDS file, the mapping information comprises documents and images.

11. The on-demand data management system of claim 10, wherein the system further stores the mapping information in a database.

12. An on-demand data management system having a computer for receiving and analyzing a data demand comprising one of a plurality of security ranks, and selecting data from a file according to the data demand,
    wherein the file has been segmented to generate a plurality of segmented files, and the plurality of segmented files are designated as viewable by the plurality of security ranks,
    wherein the system analyzes the data demand according to mapping information, wherein the mapping information is the relationship of the segmented file and attributes thereof, wherein the attributes comprise a file extension of the file, and the mapping information further comprises documents and images when the file is a GDS file, and the GDS file is segmented according to a plurality of GDS levels included in an intrinsic file hierarchy in the GDS file of the attributes.

13. The on-demand data management system of claim 12, wherein the system selecting the data further refers to the mapping information.

14. The on-demand data management system of claim 12, wherein the system further displays the mapping information.

15. A computer implemented on-demand data management method, comprising the steps of:
    receiving at least one file, wherein each file has attributes, wherein the attributes comprise a file extension of the file, the at least one file is a GDS (Graphics Data System) file, and the attributes further comprise a file hierarchy of the at least one file;
    segmenting each file according to a plurality of GDS levels included in the file hierarchy of attributes to generate a plurality of segmented file, the plurality of segmented files are designated as viewable by a plurality of security ranks; and
    receiving and analyzing a data demand comprising one of the plurality of security ranks and selecting data from the plurality of segmented files according to the data demand.

16. The computer implemented on-demand data management method of claim 15, further storing the plurality of segmented files in a database.

17. The computer implemented on-demand data management method of claim 15, further collecting the relationship of the attributes and the plurality of segmented files as mapping information, and if the file is a GDS file, the mapping information comprises documents and images.

18. The computer implemented on-demand data management method of claim 17, further storing the mapping information in a database.

19. The computer implemented on-demand data management method of claim 17, wherein the data demand is analyzed according to the mapping information.

20. The computer implemented on-demand data management method of claim 17, wherein the data selection is performed further referring to the mapping information.

21. The computer implemented on-demand data management method of claim 17, further displaying the mapping information.

* * * * *